A. E. WINDLE.
COMBINED ATOMIZER AND BURNER FOR LIQUID FUELS.
APPLICATION FILED JUNE 3, 1919.

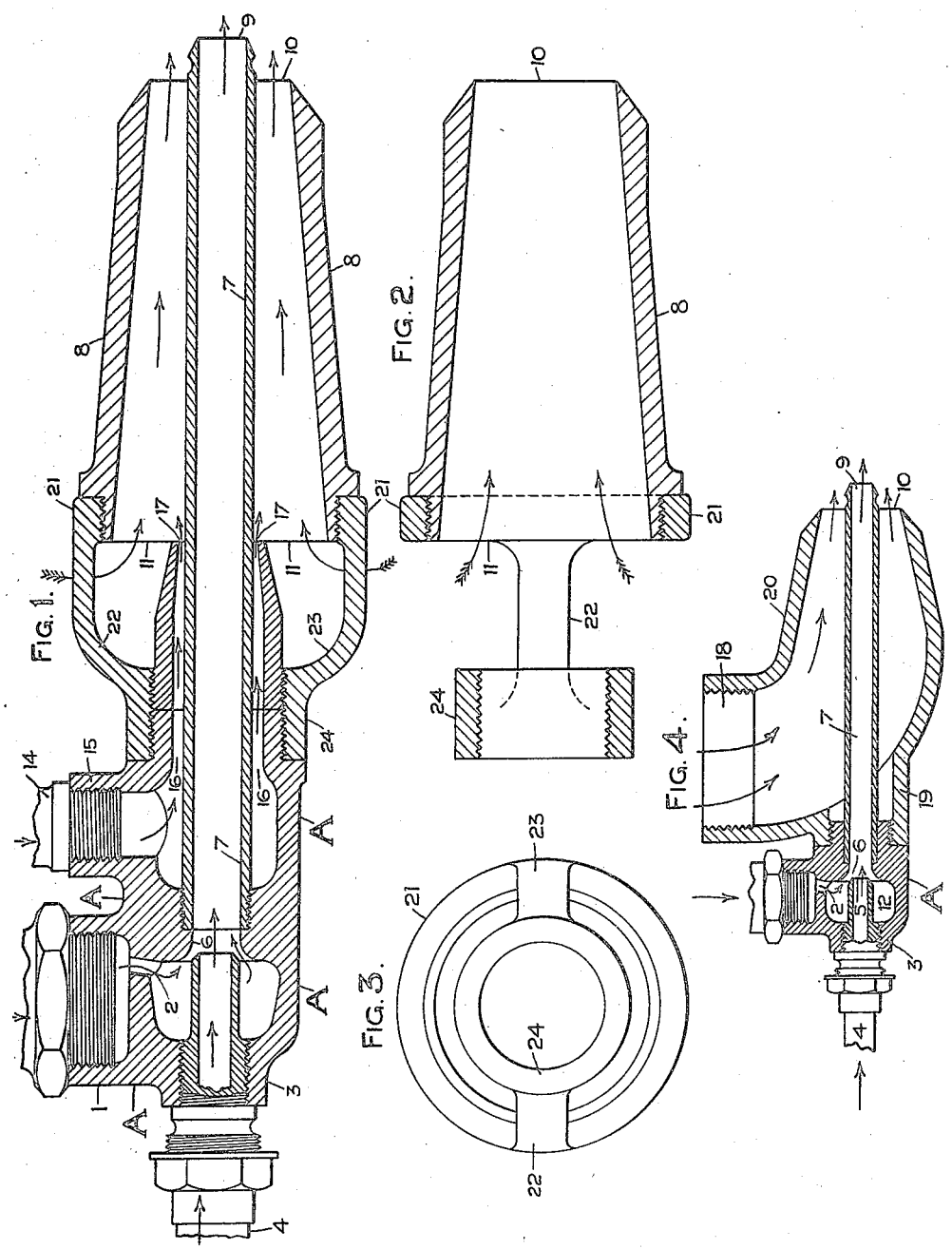

1,426,697.

Patented Aug. 22, 1922.
2 SHEETS—SHEET 2.

INVENTOR:
Albert Ernest Windle
By Wm Wallace White
ATTY.

UNITED STATES PATENT OFFICE.

ALBERT ERNEST WINDLE, OF GRAVELLY HILL, BIRMINGHAM, ENGLAND.

COMBINED ATOMIZER AND BURNER FOR LIQUID FUELS.

1,426,697. Specification of Letters Patent. Patented Aug. 22, 1922.

Application filed June 3, 1919. Serial No. 301,468.

*To all whom it may concern:*

Be it known that I, ALBERT ERNEST WINDLE, subject of His Majesty the King of Great Britain and Ireland, residing at 61 Wheelwright Road, Gravelly Hill, Birmingham, England, have invented new and useful Improvements in Combined Atomizers and Burners for Liquid Fuels, of which the following is a specification.

This invention has reference to combined atomizers and burners for burning pitch creosote mixtures and other liquid fuels in furnaces and the like, the object of my invention being to provide a combined atomizer and burner which will burn the cheaper kinds of pitch cresote mixtures and with the minimum of attention will ensure regular feeding of the liquid fuel to the combined atomizer and burner with a high degree of atomization and perfect admixture, and which will be of simple construction and comparatively cheap to manufacture.

According to my invention the liquid fuel (hereinafter referred to as the "oil") after passing through a suitable filter and a regulating valve for regulating or shutting off the supply of the liquid fuel (such filter and regulating valve forming no part of my present invention), the oil enters a part of the burner which I call an atomizing member which is made with a transverse passage having an outlet on to and around the inner periphery of which the oil flows and along a pipe of about the same diameter as said outlet leading to the nozzle of the burner. Air under pressure passes through said transverse passage and forces the oil through the so called atomizing member and along the inner periphery of said passage and the pipe leading to the nozzle of the burner where said outlet tube projects slightly beyond the nozzle of a suitable induction pipe leading into the furnace. This induction pipe has at its back end an enlarged or trumpet mouth shaped air inlet. The air entering this induction pipe may be at ordinary atmospheric pressure with its flow accelerated and its bulk increased by a supply of high pressure air which flows into the back end of the induction pipe through an annular passage and round the said pipe through which as aforesaid flows the stream of oil to the nozzle, or the air entering both the atomizer and the induction pipe may be at a low pressure; or the air passing through the so called induction pipe may be at a low pressure whilst using comparatively high pressure air through the atomizer.

As the air and oil issue through the nozzle of the burner there is a central stream of air from the central tube surrounded by a ring of oil particles blown off from the inner periphery of said tube which are surrounded by another ring of air issuing through the induction pipe, so that the oil particles being enclosed between the two streams of air which are travelling at different speeds become thoroughly mixed at the burner nozzle and all the oil is properly consumed.

My invention is illustrated by the accompanying drawings of which

Fig. 1 is a longitudinal sectional elevation of one form of combined liquid fuel atomizer and burner constructed according to my invention;

Fig. 2 is a sectional plan of the induction pipe of the same separately;

Fig. 3 is an end elevation of said induction pipe;

Fig. 4 is a longitudinal sectional elevation of a modified form of said combined atomizer and burner;

Figure 5:
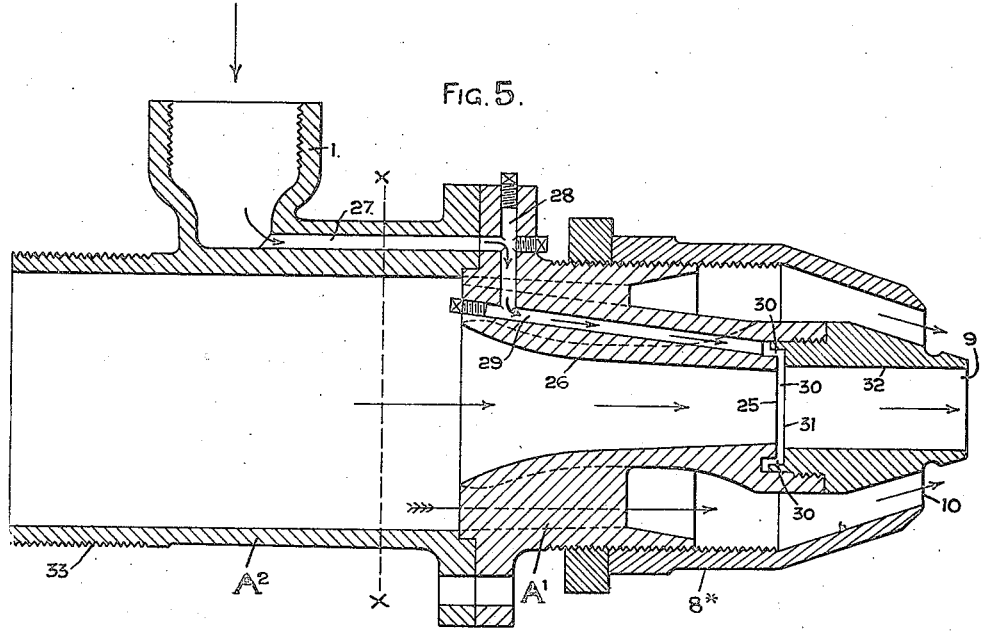
Fig. 5 is a longitudinal sectional elevation of a further modification of my said invention.

In the arrangement of my invention illustrated by Figs. 1, 2, 3, the body part or casing A is hollow and somewhat of an inverted T shape having the branch 1 connected to a regulator valve of the oil supply leading from the filter and entering the interior of the body through the small inlet hole 2. Neither the filter nor the regulator valve form any part of my present invention. The body part A has a through passage, one branch 3 of which is connected to the air supply under pressure which enters by the pipe 4 and issues through the outlet end 5 which preferably projects slightly into the outlet orifice 6 of the body and in which is fixed the nozzle pipe 7 leading into and through the induction pipe 8. This pipe 7 is of about the same internal diameter as is the outlet 6. It will thus be seen that the members 5 and 7 form a two-part nozzle of different diameters and spaced apart. The front 9 of the nozzle pipe 7 preferably projects slightly beyond the front end 10 of the induction pipe 8. The outlet 6 of the body A is made slightly larger than the exterior of the front end 5 of the pipe 4 which projects into the same. The induction pipe 8 is enlarged at its back end 11 and tapers gradually to a smaller diameter at its outlet end 10. Air at atmospheric pressure is as hereinafter described drawn into the induction pipe 8 at the back as indicated by the arrows in Figs. 1 and 2.

When the burner is at work the oil entering the body part A by the inlet 2 flows on to and around the inner periphery of the enlargement 12 of the through passage of the body and also around the inner periphery of the outlet 6 so that the oil is by the stream of air from the pipe 4 atomized slightly at the outlet 6, but the bulk of the oil is carried forward along the periphery of the nozzle pipe 7 and a current of air is induced through the induction pipe 8 which mixes with the atomized fuel supply at the outlet.

It will be seen that as the air and oil issue through the pipe 9 there is a central stream of air from the tube 9 surrounded by a stream of oil particles blown off from the inner periphery of the outlet of the tube 9 and these are surrounded by another ring of air issuing from the induction pipe 10 and as this stream through the induction pipe 10 is travelling at a slower speed than the air through the pipe 7, it follows that the oil particles will become thoroughly mixed with the air and that thorough combustion is assured.

In order to increase the supply of air through the induction pipe 8 as indicated by the arrows it is preferred to provide a supply of comparatively high pressure air, say at about eight pounds per square inch which enters the body A by the pipe 14 fitted to the branch 15 so that the air flows along the annular space 16 round the oil pipe 7 and passes out through the annular outlet 17 into the induction pipe 8 so as to increase the flow of air therethrough as aforesaid, and thus supply sufficient air for proper combustion.

For convenience of manufacture of the burner and to facilitate renewal of the induction pipe 8 the latter can conveniently be screwed into the ring like fitting 21 which has two arms 22, 23, formed with a back boss 24 which is screwed on to the fore end of the body A.

In a modified arrangement of my invention where comparatively high pressure air (say at about eight pounds per square inch) is used to pass through the oil feed or atomizer by the pipe 4, and low pressure air, such as would be used on a blacksmith's hearth is supplied to flow through the so called induction pipe, the induction pipe as shown by Fig. 4 can be made with a lateral inlet branch pipe 18 to connect to the low pressure blast pipe and with a back boss 19 on the axis of the outlet end 10 of the induction pipe 20 to which boss 19 will be fixed the atomizer body A furnished with the nozzle pipe 7 as aforesaid to lead the oil along to the outlet, this pipe 7 being arranged as aforesaid axially with the so called induction pipe 20. Thus the nozzle pipe 7 can be inserted in the boss 19 and the body A be screwed or otherwise fixed therein and can readily be removed without disturbing the connection at 18 of the induction pipe to the compressed air supply.

Figure 6:
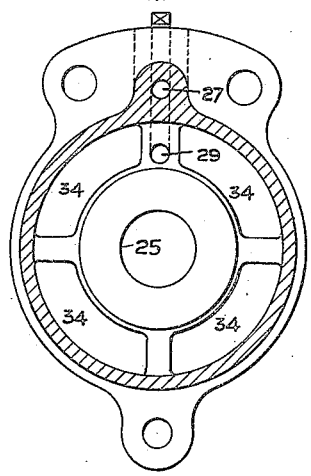
Fig. 6 is a cross sectional elevation taken on line X X of Fig. 5.

When my invention is arranged to be worked with low pressure air through the atomizer and also low pressure air through what I call the induction pipe, then owing to this low pressure of the air for atomizing, the oil feed member is arranged (see Figs. 5 and 6) but a short distance in from the outlet end 9 of the nozzle pipe and the outlet end 10 of the induction pipe. This is preferably done by the front end 25 of the pipe 26 which supplies the compressed air for partially atomizing and driving the oil along the inner periphery of the nozzle pipe 32 (and which corresponds to the outlet end 5 of the pipe 4 in Figs. 1 and 4) being arranged within the circular oil feed body composed of the front part $A^1$ and the back part $A^2$ which is made of considerably larger diameter than the pipe 26. The back part $A^2$ of this body part carries the branch 1 for the oil supply which flows along the passages 27, 28, 29, to the rebated annular space 30 between the front end 25 of the pipe 26 and the back end 31 of the nozzle pipe 32, which latter corresponds with the nozzle pipe 7 in the arrangement shown by Figs. 1 and 4. This outlet 25 is made of somewhat smaller diameter than the back end 31 of the pipe 32 and as the oil flows around the inner periphery of the annular rebated space 30 and round the inner periphery of the back end of the pipe 32 the oil is by the stream of air passing through the pipe 26 partially atomized and carried forward through and along the inner periphery of the nozzle pipe 32 and mixes with the further supply of low pressure air issuing through the induction pipe outlet 10. The back part $A^2$ of the body is adapted to be connected at 33 on to the front end of the blast pipe so that a portion of the blast passes through the annular space 34 between the interior of the front part $A^1$ and the exterior of the pipe 26 and so on through the induction pipe $8^x$ which is screwed on to the outside of the fore parts $A^1$ of the body and surrounds the low pressure air pipe 26 and the nozzle pipe 32 and the annular atomizer space 30.

What I claim as my invention and desire to secure by Letters Patent is:—

1. A combined atomizer and burner for heavy fuels comprising a casing having an opening therethrough, a primary air inlet tube leading into one end of said casing, a fuel inlet passage in said casing, said fuel inlet passage terminating in an annular chamber disposed around the discharge end of the primary air inlet tube, an inner discharge nozzle leading from said chamber for the passage of fuel and primary air, and on the outer tube for secondary air surrounding the inner discharge nozzle, the end of the inner discharge nozzle projecting beyond the end of said outer tube.

2. A combined atomizer and burner for heavy fuels comprising a casing having an opening therethrough, a primary air inlet tube leading into one end of said casing, an inclined fuel inlet passage in said casing, said fuel inlet passage terminating in an annular chamber disposed around the discharge end of the primary air inlet tube, an inner discharge nozzle leading from said chamber for the passage of fuel and primary air, and an outer tube for secondary air surrounding the inner discharge nozzle, the end of the inner discharge nozzle projecting beyond the end of said outer tube.

In testimony whereof I have signed my name to this specification.

ALBERT ERNEST WINDLE.